United States Patent Office 3,432,526
Patented Mar. 11, 1969

3,432,526
5,9 - EPOXY - 6,7,8,9 - TETRAHYDRO - 5H - BENZO-
CYCLOHEPTEN-5-OLS AND PROCESS FOR PRE-
PARING SAME
Eugene E. Galantay, Morristown, N.J., assignor to
Sandoz Inc., Hanover, N.J.
No Drawing. Filed June 23, 1966, Ser. No. 559,727
U.S. Cl. 260—345.9                            3 Claims
Int. Cl. C07d 7/18, 7/04

ABSTRACT OF THE DISCLOSURE 6-amino - 6,7,8,9 - tetrahydro-5H-benzocyclohepten-5-ols are useful as therapeutics. These compounds are prepared from 6,7,8,9 - tetrahydro-5H-benzocyclohepten-5-ones which are in turn prepared from appropriate 5,9-epoxy-6,7,8,9-tetrahydro-5H-benzocyclohepten-5-ols, e.g., 5,9-epoxy-9-phenyl-6,7,8,9-tetrahydro - 5H - benzocyclohepten-5-ol, which compounds are prepared by reacting an appropriate 5,6,7,8-tetrahydro-5H-benzocyclohepten-5,9-dione with an aryl argano-metallic agent.

---

This invention relates to bicyclic compounds. In particular, the invention pertains to benzocycloheptenones, improved processes for preparing the same and intermediates utilized in said processes.

The benzocycloheptenones to which the present invention relates are of the formula:

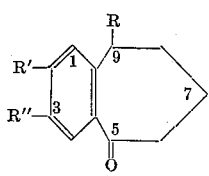

(I)

wherein

R represents phenyl or p-chlorophenyl; and
R' and R" each represent hydrogen or lower aloxy, preferably containing from 1 to 4 carbon atoms, e.g., methoxy, ethoxy, propoxy and butoxy.

The compound of Formula I wherein R is phenyl and R' and R" are both hydrogen is old and may be prepared in the manner described by L. H. Klemm and G. M. Bower in the J. Org. Chem., 23, 344 (1958). The other compounds represented by Formula I may likewise be prepared in the manner described in the above publication. However, the process described therein involves a multistep synthesis which includes a "high dilution cyclization" step, and is therefore commercially impractical from the standpoint of the time involved and the yields obtained.

It has now been discovered that the above compounds may be prepared conveniently and in an economical manner by a process which involves reacting a 5,6,7,8-tetrahydro-5H-benzocyclohepten-5,9-dione with an arylmagnesium halide or an aryllithium compound, hydrolyzing the resulting complex in an aqueous acidic medium to form the corresponding 5,9-epoxy-6,7,8,9-tetrahydro-5H-benzocyclohepten-5-ol, dehydrating the latter to form the corresponding 6,7 - dihydro-5H-benzocyclohepten-5-one and reducing the latter. This process may be illustrated as follows:

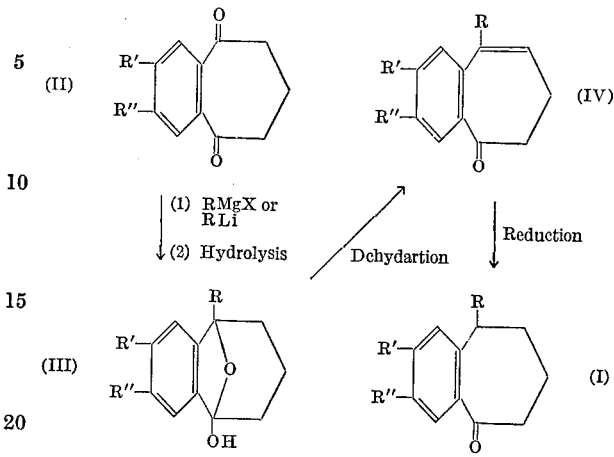

wherein

R, R' and R" are as previously defined; and
X represents halogen, preferably chlorine or bromine.

The reaction of the dione (II) with the arylmagnesium halide or aryllithium compound is carried out in a suitable inert organic solvent, and at room temperature (20–25° C.) or below. Suitable solvents include the ether-like solvents, e.g., diethyl ether, tetrahydrofuran and mixtures thereof, or mixtures of ether-like solvents with toluene or benzene. The intermediate epoxy derivatives of Formula III are obtained by hydrolyzing the resulting complex in an aqueous acidic medium, preferably dilute aqueous mineral oil, e.g., dilute aqueous sulfuric acid and the like. Dehydration of the epoxy derivative (III) is effected in conventional manner at room temperature or elevated temperatures employing any conventional acid dehydrating agent. However, it is preferred to carry out the dehydration at 25 to 50° C. employing 105% phosphoric acid as the dehydrating agent. Reduction of the 6,7-dihydro-5H-benzocyclohepten-5-one (IV) to form the corresponding 6,7,8,9-tetrahydro derivative (I) is effected by conventional hydrogenation, preferably catalytic, employing palladium or other appropriate catalyst generally employed for acrrying out reactions of this nature.

The starting compounds (II) employed in the above processes are either known and can be prepared as described in the literature or if not specifically known, can be prepared from available materials in analogous manner.

The compounds of Formula I are useful as intermediates for the preparation of 6-amino-6,7,8,9-tetrahydro-5H-benzocyclohepten-5-ols of the formula

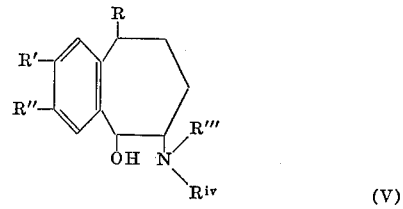

(V)

wherein R, R', and R" have the same significance as previously indicated with respect to Formula I hereinabove and R''' and R$^{iv}$ each represent hydrogen or lower alkyl. Compounds of Formula V in turn possess anorexigenic activity and can be utilized either therapeutically for the treatment of existing obesity or prophylactically whenever a predisposition to obesity exists or where, for other reasons, it is desired to reduce caloric intake. For such usage, satisfactory results are obtained when the compounds are administered either orally or parenterally in any of the conventional pharmaceutical forms, e.g., tablets, capsules, injectable solutions and the like, and at a daily dosage of from about 10 milligrams to about 150 milligrams, preferably given in divided doses of from about 2.5 milligrams to about 75 milligrams, two to four times a day or in sustained release form.

The compounds of Formula V are prepared by nitrosation of the corresponding 6,7,8,9-tetrahydro-5H-benzocyclohepten-5-one of Formula I to form the corresponding 6-isonitroso-6,7,8,9-tetrahydro-5H-benzocyclohepten-5-one and then reducing the latter in a solvent system which also serves as an acylating medium to form the corresponding 6-acylamino-6,7,8,9-tetrahydro-5H-benzocyclohepten-5-one. The latter is then converted to the corresponding compound of Formula V, wherein R''' and R$^{iv}$ are both hydrogen, by either (1) hydrolyzing the 6-acylamino-6,7,8,9-tetrahydro - 5H - benzocyclohepten-5-one to form the corresponding 6-amino-6,7,8,9-tetrahydro-5H-benzocyclohepten-5-one (as a salt) and then reducing the latter, or (2) first reducing said 6-acylamino-6,7,8,9 - tetrahydro-5H-benzocyclohepten-5-one to form the corresponding 6-acylamino - 6,7,8,9 - tetrahydro-5H-benzocyclohepten-5-ol and then hydrolyzing the latter. The compounds of formula V wherein

is alkylamino or dialkylamino are prepared from the thus-obtained 6-amino-6,7,8,9-tetrahydro-5H-benzocyclohepten-5-ol by alkylation. The over-all process is illustrated on the following page.

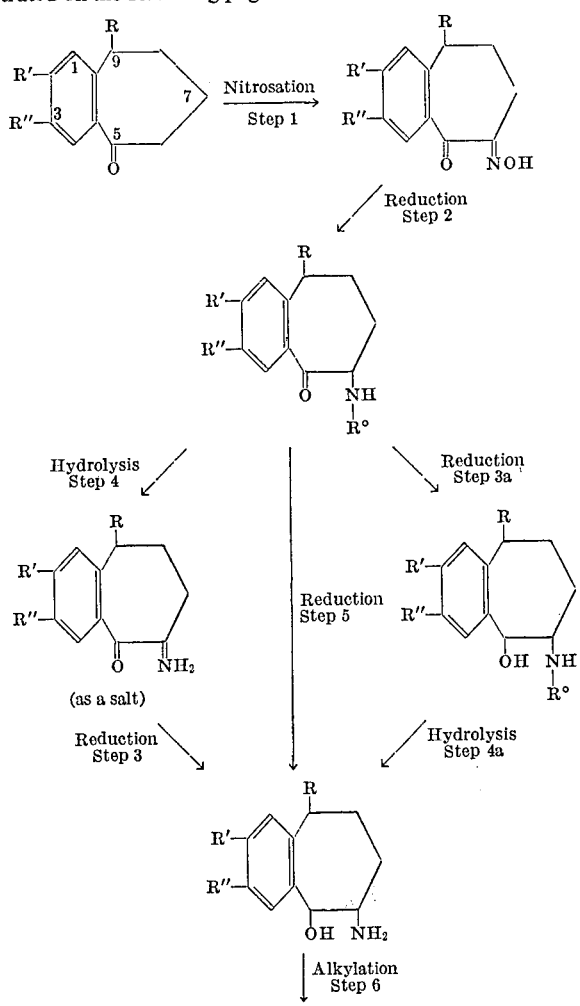

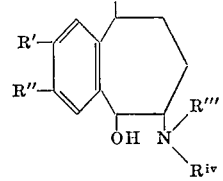

In the above reaction scheme, R, R', R'', R''' and R$^{iv}$ are as previously defined and R° represents acyl, preferably lower alkanoyl.

The general conditions for carrying out the above process are as follows:

Step 1

Conveniently effected in conventional manner employing an appropriate inert organic solvent, e.g., benzene, toluene and diethyl ether, and a lower alykl nitrite, e.g., ethyl nitrite, butyl nitrite and amyl nitrite. Preferably, the reaction is carried out at a temperature below room temperature, e.g., 0–5° C. and in the presence of a strong anhydrous acid or base, such as, hydrochloric acid or sodium methoxide, respectively.

Step 2

Conventional reduction, preferably catalytic, of the isonitroso group in a solvent system which can also serve as an acylating medium, such as, a mixture of a lower alkanoic acid and its corresponding anhydride, e.g., acetic acid and acetic anhydride, and in the presence of a suitable hydrogenation catalyst, such as, palladium/charcoal.

Steps 3 and 3a

Conventional reduction of the ring carbonyl with sodium borohydride or other appropriate reducing agent which is capable of reducing ketones to the corresponding alcohols. Where the reduction is carried out prior to hydrolysis (Step 3a), it can be effected with sodium borohydride or other reducing agent which is capable of selectively reducing the ring carbonyl without affecting the acyl group attached to such ring.

Steps 4 and 4a

Conventional hydrolysis of the acylamino group in acidic medium, e.g., aqueous hydrochloric acid and aqueous hydrobromic acid.

Step 5

Alternate procedure for preparing the 6-amino-6,7,8,9-tetrahydro-5H-benzocyclohepten-5-ols directly from the corresponding 6-acyl-amino-6,7,8,9-tetrahydro-5H-benzocyclohepten-5-ones by conventional reduction with lithium aluminum hydride or other appropriate reducing agent which is capable of simultaneously reducing both the ring carbonyl and acyl group.

Step 6

Conventional alkylation of the 6-amino-6,7,8,9-tetrahydro-5H-benzocyclohepten-5-ol. Compounds which are substituted at the 6-position with either an alkylamino or a dialylamino group having the same alkyl substitutents are conveniently prepared employing the required stoichiometric amount of the appropriate alkylating agent. Those compounds which are substituted at the 6-position with dimethylamino are readily prepared by the Eschweiler-Clarke Modification. For those compounds having a dialkylamino group containing different alkyl groups, alkylation is effected in two steps each of which employs the appropriate alkylating agent.

The invention is further illustrated by the following representative examples. However, it is to be understood that the examples are for illustration only and are not in- Example 1.—9-phenyl-6,7,8,9-tetrahydro-5H-benzocyclohepten-5-one

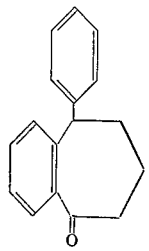

Step. A.—Preparation of 5,9-epoxy-9-phenyl-6,7,8,9-tetrahydro-5H-benzocyclohepten-5-ol To a solution of 40.0 g. of 6,7,8,9-tetrahydro-5H-benzocyclohepten-5,9-dione [Dieckmann, Ber., 32, 2227 1899)] in 250 ml. of tetrahydrofuran, stirred at −70° C., is added over a period of 60 minutes, 109.3 ml. of a phenyl-lithium solution (0.89 g./ml. of benzene-diethyl ether 3:1). The mixture is maintained at −20° C. for 17 hours, then 150 ml. of cold 2 N sulfuric acid is added and the oily organic phase isolated with chloroform. Crystallization of the resulting product from diethyl ether-petroleum ether yields 5,9-epoxy-9-phenyl-6,7,8,9-tetrahydro-5H-benzocyclohepten-5-ol, M.P. 164–167° C.

Step B.—Preparation of 9-phenyl-6,7-dihydro-5H-benzocyclohepten-5-one

A mixture of 18.2 g. of 5,9-epoxy-9-phenyl-6,7,8,9-tetrahydro-5H-benzocyclohepten-5-ol and 180 g. of 105% phosphoric acid is stirred at 50° C. for 2 hours, then poured onto ice and the resulting mixture extracted with chloroform. Evaporation of the solvent yields 9-phenyl-6,7-dihydro-5H-benzocyclohepten-5-one, M.P. 79–81° C.

Step C.—Preparation of 9-phenyl-6,7,8,9-tetrahydro-5H-benzocyclohepten-5-one

An ethyl acetate solution of 2.0 g. of 9-phenyl-6,7-dihydro-5H-benzocyclohepten-5-one is stirred with 5% pallaidium-carbon catalyst in a hydrogen atmosphere until the calculated volume of hydrogen is consumed. The catalyst is then filtered off and the filtrate evaporated to yield 9-phenyl-6,7,8,9-tetrahydro-5H-benzocyclohepten-5-one, M.P. 59° C.

Example 2.—2,3-dimethoxy-9-p-chlorophenyl-6,7,8,9-tetrahydro-5H-benzocyclohepten-5-one

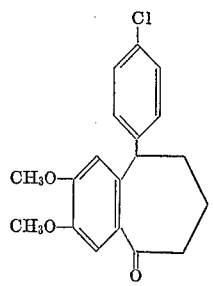

Step A.—Preparation of 2,3-dimethoxy-5,9-epoxy-9-p-chlorophenyl - 6,7,8,9-tetrahydro-5H-benzocyclohepten-5-ol Following the procedure of Step A of Example 1 and employing an equivalent amount of 2,3-dimethoxy-6,7,-8,9 - tetrahydro - 5H-benzocyclohepten-5,9-dione and p-chlorophenylmagnesium bromide in place of the 6,7,8,9-tetrahydro-5H-benzocyclohepten-5,9-dione and phenyl-lithium, respectively, used therein, there is obtained the compound 2,3 - dimethoxy - 5,9-epoxy-9-p-chlorophenyl-6,7,8,9-tetrahydro-5H-benzocyclohepten-5-ol.

Step. B.—Preparation of 2,3-dimethoxy-9-p-chlorophenyl-6,7-dihydro-5H-benzocyclohepten-5-one Following the procedure of Step B of Example 1 and employing an equivalent amount of 2,3-dimethoxy-5,9-epoxy - 9 - p-chlorophenyl-6,7,8,9-tetrahydro-5H-benzocyclohepten-5-ol in place of the 5,9-epoxy-9-phenyl-6,7,8,9-tetrahydro-5H-benzocyclohepten-5-ol used therein, there is obtained crude 2,3-dimethoxy-9-p-chlorophenyl-6,7-dihydro-5H-benzocyclohepten-5-one, M.P. 154–159° C. Recrystallization from benzene followed by vacuum sublimation yields purified material, M.P. 158–160° C.

Step C.—Preparation of 2,3-dimethoxy-9-p-chlorophenyl-6,7,8,9-tetrahydro-5H-benzocyclohepten-5-one Following the procedure of Step C of Example 1 and employing an equivalent amount of 2,3-dimethoxy-9-p-chlorophenyl-6,7-dihydro-5H-benzocyclohepten-5-one in place of the 9-phenyl-6,7-dihydro-5H-benzocyclohepten-5-one used therein, there is obtained crude 2,3-dimethoxy-9 - p - chlorophenyl - 6,7,8,9-tetrahydro-5H-benzocyclohepten-5-one. Recrystallization from ethyl acetate affords material, M.P. 113–114° C.

What is claimed is:
1. A compound of the formula

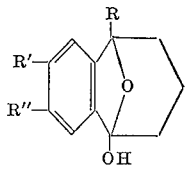

wherein

R represents phenyl or p-chlorophenyl, and
R′ and R″ each independently represents hydrogen or lower alkoxy.

2. The compound of claim 1 which is 5,9-epoxy-9-phenyl-6,7,8,9-tetrahydro-5H-benzocyclohepten-5-ol.

3. A process which comprises reacting a compound of the formula

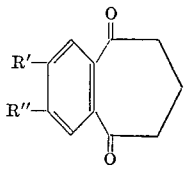

wherein R′ and R″ each independently represent hydrogen or lower alkoxy, with a compound of the formula RY, wherein R represents phenyl or p-chlorophenyl and Y represents lithium, magnesium chloride or magnesium bromide, and hydrolyzing the resulting complex in an aqueous, acidic medium to form the corresponding compound of the formula

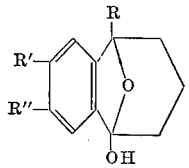

wherein R, R′ and R″ are as previously defined.

References Cited

Chemical Abstracts, vol. 61, p. 11,947 (1964).

NORMA S. MILESTONE, *Primary Examiner.*

U.S. Cl. X.R.

260—345.2, 590, 571, 999